United States Patent

Ooba

(10) Patent No.: US 10,692,018 B2
(45) Date of Patent: Jun. 23, 2020

(54) MACHINE LEARNING DEVICE AND MACHINE LEARNING METHOD FOR LEARNING OPTIMAL OBJECT GRASP ROUTE

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 316 days.

(21) Appl. No.: 15/708,130

(22) Filed: Sep. 19, 2017

(65) Prior Publication Data

US 2018/0089589 A1    Mar. 29, 2018

(30) Foreign Application Priority Data

Sep. 27, 2016  (JP) .................................. 2016-188857

(51) Int. Cl.
  *G06F 15/18* (2006.01)
  *G06N 20/00* (2019.01)
  (Continued)

(52) U.S. Cl.
  CPC .............. *G06N 20/00* (2019.01); *B25J 9/163* (2013.01); *B25J 9/1612* (2013.01); *B25J 13/087* (2013.01);
  (Continued)

(58) Field of Classification Search
  CPC .. G06N 20/00–20; G06N 3/008; G06N 3/084; B25J 9/1612; B25J 9/163;
  (Continued)

(56) References Cited

U.S. PATENT DOCUMENTS 9,333,649 B1 * 5/2016 Bradski .................... B25J 9/163
9,393,693 B1 * 7/2016 Kalakrishnan ......... B25J 9/1671
(Continued)

FOREIGN PATENT DOCUMENTS

CN   102785046 A   11/2012
CN   103764352 A   4/2014
(Continued)

OTHER PUBLICATIONS

Baier-Löwenstein and Zhang "Learning to Grasp Everyday Objects using Reinforcement-Learning with Automatic Value Cut-Off", 2007, 2007 IEEE/RSJ International Conference on Intelligent Robots and Systems.*
(Continued)

*Primary Examiner* — Jue Louie
(74) *Attorney, Agent, or Firm* — Hauptman Ham, LLP (57) ABSTRACT

A machine learning device according to the present invention learns an operation condition of a robot that stores a plurality of objects disposed on a carrier device in a container using a hand for grasping the objects. The machine learning device includes a state observation unit for observing the positions and postures of the objects and a state variable including at least one of cycle time to store the objects in the container and torque and vibration occurring when the robot grasps the objects during operation of the robot; a determination data obtaining unit for obtaining determination data for determining a margin of each of the cycle time, the torque, and the vibration against an allowance value; and a learning unit for learning the operation condition of the robot in accordance with a training data set constituted of a combination of the state variable and the determination data.

10 Claims, 10 Drawing Sheets

(51) Int. Cl.
*G05B 19/418* (2006.01)
*B25J 9/16* (2006.01)
*B25J 13/08* (2006.01)
*G06N 3/00* (2006.01)
*G06N 3/08* (2006.01)

(52) U.S. Cl.
CPC ........ *B25J 13/088* (2013.01); *G05B 19/4182* (2013.01); *G05B 2219/39106* (2013.01); *G05B 2219/40007* (2013.01); *G06N 3/008* (2013.01); *G06N 3/084* (2013.01); *Y02P 90/083* (2015.11)

(58) Field of Classification Search
CPC ...... B25J 13/087; B25J 13/088; Y02P 90/083; G05B 19/4182; G05B 2219/39106; G05B 2219/40007
USPC .............................. 706/12–44; 700/246–264
See application file for complete search history.

(56) References Cited

U.S. PATENT DOCUMENTS

| | | | | |
|---|---|---|---|---|
| 2007/0288124 | A1* | 12/2007 | Nagata | B25J 9/1694 700/258 |
| 2010/0094786 | A1* | 4/2010 | Gupta | G06N 20/00 706/12 |
| 2011/0082586 | A1 | 4/2011 | Nishihara | |
| 2013/0166061 | A1* | 6/2013 | Yamamoto | B25J 9/1664 700/214 |
| 2014/0074288 | A1* | 3/2014 | Satou | B25J 9/1679 700/253 |
| 2014/0371907 | A1* | 12/2014 | Passot | G06N 3/008 700/257 |
| 2016/0016311 | A1* | 1/2016 | Konolige | B25J 5/007 700/245 |
| 2016/0039090 | A1* | 2/2016 | Oyamada | B25J 9/163 700/253 |
| 2016/0052128 | A1* | 2/2016 | Zimmermann | B25J 9/0081 700/261 |
| 2016/0176043 | A1* | 6/2016 | Mishra | B25J 15/0466 700/248 |

FOREIGN PATENT DOCUMENTS

| | | |
|---|---|---|
| CN | 102785046 B | 5/2015 |
| CN | 105388879 A | 3/2016 |
| DE | 102006031178 B4 | 8/2008 |
| DE | 112009001414 T5 | 4/2011 |
| DE | 102015008195 A1 | 1/2016 |
| EP | 1518648 A2 | 3/2005 |
| EP | 2537644 A1 | 12/2012 |
| EP | 2998076 A1 | 3/2016 |
| JP | H10-249765 A | 9/1998 |
| JP | 2002-113678 A | 4/2002 |
| JP | 2004-243475 A | 9/2004 |
| JP | 2010-134907 A | 6/2010 |
| JP | 2013-52490 A | 3/2013 |
| JP | 2014-104524 A | 6/2014 |
| JP | 2014-140943 A | 8/2014 |
| JP | 5964488 B1 | 8/2016 |

OTHER PUBLICATIONS

Kehoe et al. "Cloud-Based Robot Grasping with the Google Object Recognition Engine", 2013, 2013 IEEE International Conference on Robotics and Automation.*

Li et al. "Learning of Grasp Adaptation through Experience and Tactile Sensing", 2014, 2014 IEEE/RSJ International Conference on Intelligent Robots and Systems.*

Lukka et al. "ZenRobotics Recycler—Robotic Sorting using Machine Learning", 2014, Sensor Based Sorting.*

Kujala et al. "Picking a Conveyor Clean by an Autonomously Learning Robot", Nov. 2015, arVix.org, arXiv:1511.07608v1, retrieved from: https://arxiv.org/abs/1511.07608.*

Levine et al. "Learning Hand-Eye Coordination for Robotic Grasping with Deep Learning and Large-Scale Data Collection", Aug. 2016, arXiv:1603.02199v4, retrieved from: https://arxiv.org/abs/1603.02199.*

* cited by examiner

MACHINE LEARNING DEVICE AND MACHINE LEARNING METHOD FOR LEARNING OPTIMAL OBJECT GRASP ROUTE

This application is a new U.S. patent application that claims benefit of JP 2016-188857 filed on Sep. 27, 2016, the content of 2016-188857 is incorporated herein by reference.

BACKGROUND OF THE INVENTION

1. Field of the Invention

The present invention relates to a machine learning device and a machine learning method, and more specifically relates to a machine learning device and a machine learning method for learning an optimal object grasp route when a robot grasps objects disposed on a carrier device.

2. Description of Related Art

Object carrier systems that sequentially grasp a plurality of objects carried by a carrier device, i.e., a conveyor, one-by-one with a hand (multi-fingered hand) that can hold multiple objects, and which put the objects in containers similarly carried by another conveyor are known. Conventionally, when grasping and taking out the objects, basically, the objects are grasped in the order in which the objects are located downstream of the conveyor.

For example, there is proposed a method in which a conveyor is divided in two along a conveying direction of objects, and the objects are grasped and put in containers in the order in which the objects are located downstream thereof (for example, Japanese Unexamined Patent Publication (Kokai) No. 2014-104524, hereinafter referred to as "Patent Document 1").

Figure 1:
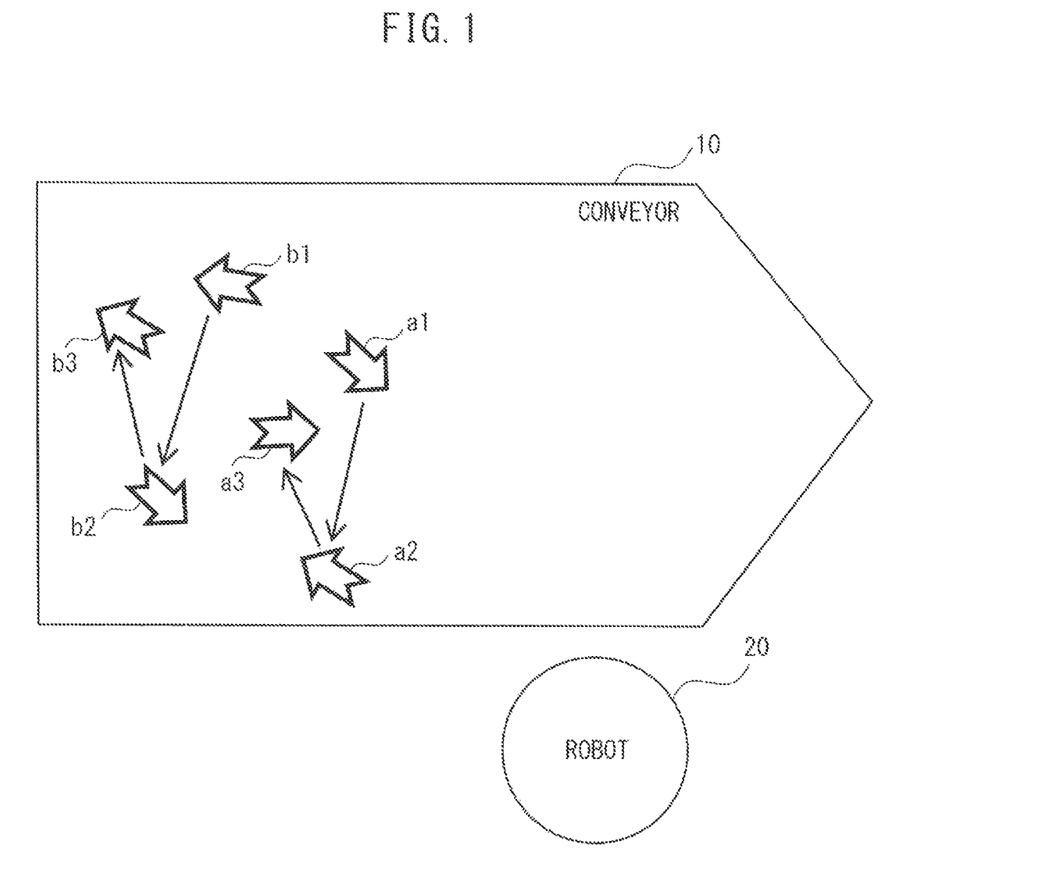
FIG. 1 is a drawing showing a method for grasping a plurality of objects disposed on a conveyor with a hand provided in a robot to put the objects in containers, according to the conventional art.

FIG. 1 shows a conventional method for grasping a plurality of objects (a1 to a3 and b1 to b3) disposed on a conveyor 10 with a hand (not shown) provided in a robot 20, and putting the objects in containers (not shown). The objects are disposed on a plane of the conveyor 10 in random orientations (postures), as indicated by the arrows of the objects (a1 to a3 and b1 to b3) themselves.

The hand has the functions of grasping three objects and putting the objects in a container. When the conveyor 10 moves from the left to the right of FIG. 1, the objects are located downstream of the conveyor 10 in order of a1, a2, and a3. Thus, the hand grasps the objects a1, a2, and a3 in this order and puts the objects in a container, and thereafter grasps the objects b1, b2, and b3 in this order and puts the objects in another container.

Conventionally, since the objects are grasped in the order in which the objects are located downstream, the hand may move back and forth, as indicated by the arrows in FIG. 1.

Furthermore, since the postures of the objects are not considered, the hand of the robot 20 may rotate significantly, as shown in FIG. 1. For example, since the objects a1 and a3 have similar postures, the hand rotates minimally when grasping the objects in order of a1, a3, and a2. However, since the hand grasps the objects in the order in which the objects are located downstream, the hand grasps the objects in order of a1, a2, and a3, as shown in FIG. 1. As a result, the hand of the robot 20 rotates about 180 degrees to grasp the object a2 after having grasped the object a1, and thereafter again rotates about 180 degrees to grasp the object a3.

The method of Patent Document 1, as described above, grasps objects in the order in which the objects are located downstream, without considering the positions of the objects in the width direction of the conveyor 10 and the orientations of the objects. Therefore, the movement time of the hand varies widely, and in some instances, the robot may fail to put the objects in a container while the container is passing in front of the robot.

It is conceivable to stop the conveyor for containers whenever the robot grasps objects. However, this is difficult to adopt in actual production sites, because there are cases where production volume is predetermined within a certain time period and conveyance of the containers cannot be stopped due to a relationship with subsequent steps.

Patent Document 1 describes a method in which an area is further divided into smaller regions, and grasping is performed in each region to reduce carry distance. However, when the conveyor is wide, dividing the area may have little effect. Furthermore, since the orientations (postures) of the objects are not considered, the robot may grasp an object that has a completely different posture from a posture which is favorable for grasping.

Furthermore, the method of Patent Document 1 does not consider the inherent ability of the robot (for example, the strength of a mechanism and the like) and the difference in carrying capacity owing to difference in the locations of the objects on the conveyor.

SUMMARY OF THE INVENTION

The present invention aims at providing a machine learning device and a machine learning method for reducing the burden on a robot having a hand that has the function of grasping a plurality of objects, as well as minimizing the cycle time that is the time required for the robot to store the objects in a container.

A machine learning device according to an embodiment of the present invention learns an operation condition of a robot that stores a plurality of objects disposed on a carrier device in a container using a hand for grasping the objects. The machine learning device includes a state observation unit for observing the positions and postures of the objects and a state variable including at least one of cycle time to store the objects in the container and torque and vibration occurring when the robot grasps the objects, during operation of the robot; a determination data obtaining unit for obtaining determination data for determining a margin of each of the cycle time, the torque, and the vibration against an allowance value; and a learning unit for learning the operation condition of the robot in accordance with a training data set constituted of a combination of the state variable and the determination data.

A machine learning method according to an embodiment of the present invention learns an operation condition of a robot that stores a plurality of objects disposed on a carrier device in a container using a hand for grasping the objects. The machine learning method includes the steps of observing the positions and postures of the objects and a state variable including at least one of cycle time to store the objects in the container and torque and vibration occurring when the robot grasps the objects, during operation of the robot; obtaining determination data for determining a margin of each of the cycle time, the torque, and the vibration against an allowance value; and learning the operation condition of the robot in accordance with a training data set constituted of a combination of the state variable and the determination data.

BRIEF DESCRIPTION OF THE DRAWINGS

The objects, features, and advantages of the present invention will become more apparent from the following detailed description of embodiments, along with accompanying drawings. In the accompanying drawings.

DETAILED DESCRIPTION OF THE INVENTION

A machine learning device and a machine learning method according to the present invention will be described below with reference to the drawings.

First Embodiment

Figure 2:
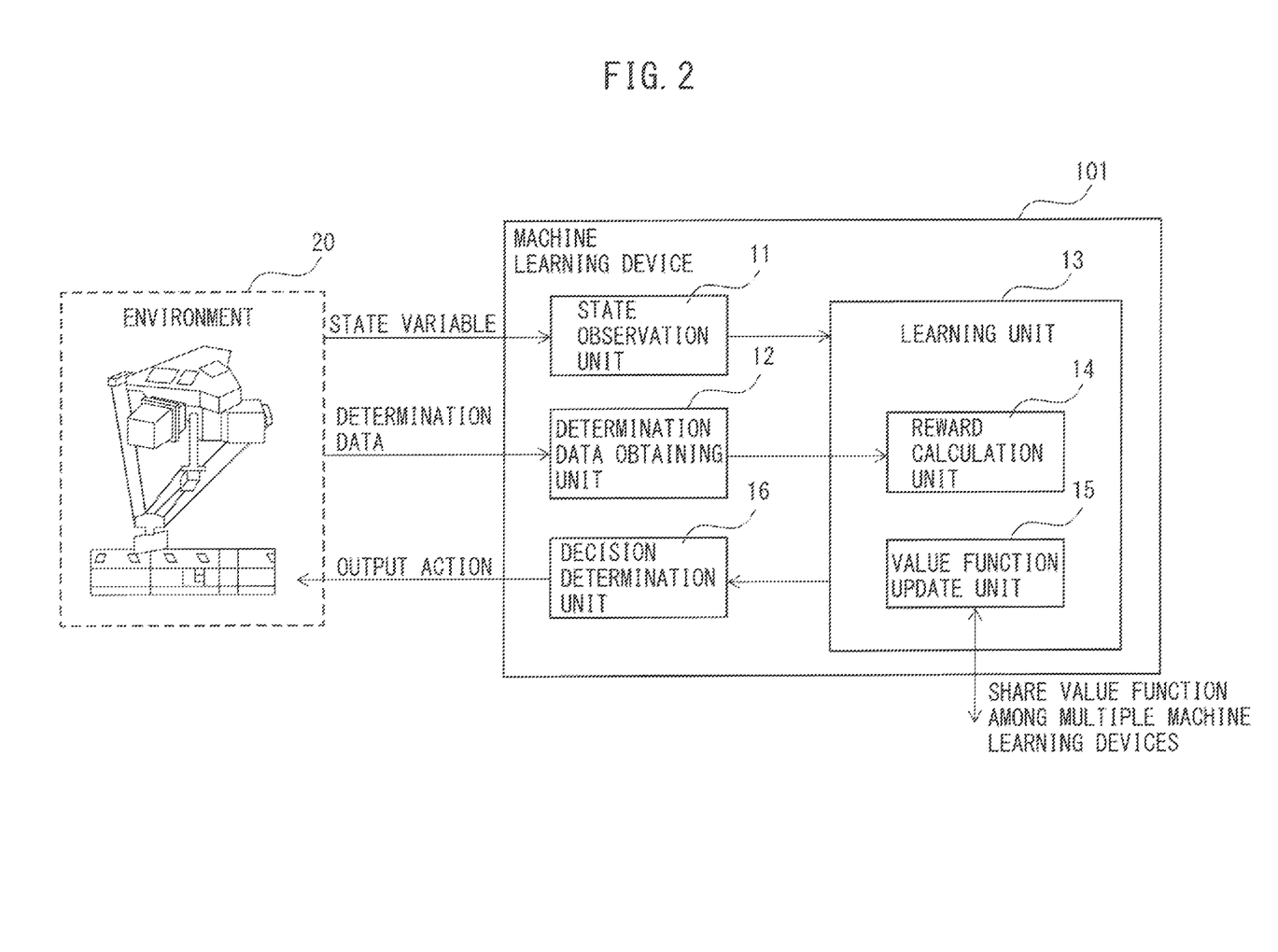
FIG. 2 is a block diagram of a machine learning device according to a first embodiment of the present invention.
Figure 3:
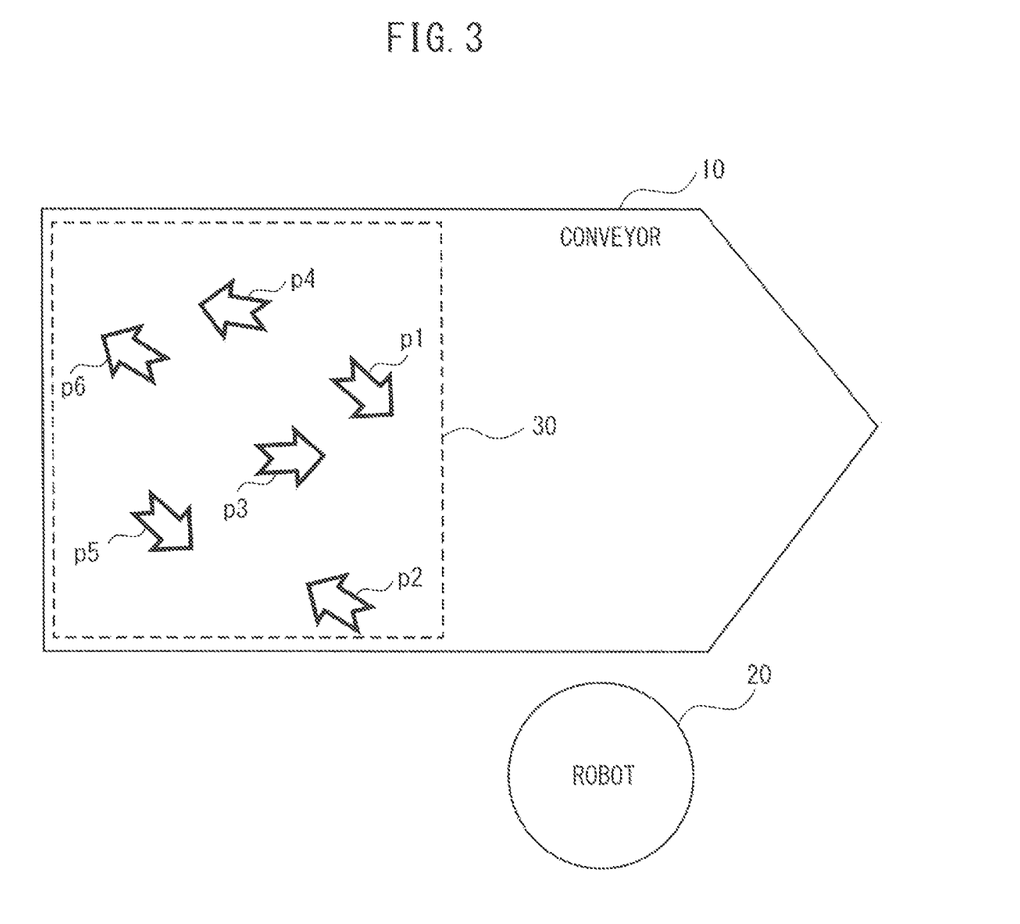
FIG. 3 is a drawing showing a method for grasping a plurality of objects disposed on a conveyor with a hand provided in a robot to put the objects in containers, by the machine learning device according to the first embodiment of the present invention.

A machine learning device according to a first embodiment will be described with reference to the drawings. FIG. 2 is a block diagram of a machine learning device 101 according to the first embodiment of the present invention. FIG. 3 is a drawing showing a method for grasping a plurality of objects disposed on a carrier device (conveyor) with a hand provided in a robot to put the objects in containers, by the machine learning device according to the first embodiment of the present invention. The machine learning device 101 according to the first embodiment of the present invention learns an operation condition of a robot 20 that stores a plurality of objects p1 to p6 disposed on a carrier device 10 in containers (not shown) using a hand (not shown) for grasping the objects.

The machine learning device 101 includes a state observation unit 11, a determination data obtaining unit 12, and a learning unit 13.

The state observation unit 11 observes the positions and postures of the objects (p1 to p6), and a state variable including at least one of cycle time to store the objects in a container and torque and vibration occurring when the robot 20 grasps the objects, during operation of the robot 20. The positions and postures of the objects may be analyzed based on an image captured by a camera (not shown). In this case, the analysis of the positions and postures of the objects is preferably completed by the time the robot 20 begins to grasp the objects (p1 to p6). The camera is thereby preferably located upstream of the conveyor 10 from the robot 20. Note that, the conveyor 10 carries the objects from the left to the right of FIGS. 3 and 5 at a constant speed.

The cycle time refers to the time from when the robot begins storing a prescribed number of objects in a container until the robot completes storing the objects in the container. The prescribed number of objects refers to objects the grasp order (route) of which is to be determined, and objects contained in a certain area 30 of FIG. 3. The robot 20 preferably has a timer for measuring the cycle time.

The torque occurs when the hand moves to the positions of the objects, and when the hand rotates depending on the postures of the objects. The torque is calculated based on currents flowing through motors for driving the hand and an arm (not shown) of the robot 20. The robot 20 preferably has ammeters for measuring the currents flowing through the motors. Note that, after the hand has grasped one object, the hand rotates while moving to a different position to grasp another object. In other words, after the hand has grasped one object, the hand moves while rotating so as to have a suitable angle for grasping the next object.

Vibration occurs when the hand moves to and stops at the positions of the objects, and when the hand rotates and stops rotating depending on the postures of the objects. To measure the vibration, the hand preferably has an acceleration sensor. The vibration is calculated based on an acceleration detected by the acceleration sensor.

The determination data obtaining unit 12 obtains determination data for determining a margin of each of the cycle time, the torque, and the vibration against its allowance value. The allowance values of the cycle time, the torque, and the vibration may be stored in a memory (not shown). All of the cycle time, the torque, and the vibration are preferably equal to or less than the allowance values.

The learning unit 13 learns the operation condition of the robot in accordance with a training data set that is constituted of a combination of the state variable and the determination data. When all of the cycle time, the torque, and the vibration are equal to or less than the allowance values, the objects are preferably grasped in the order in which the cycle time is minimized.

Figure 4:
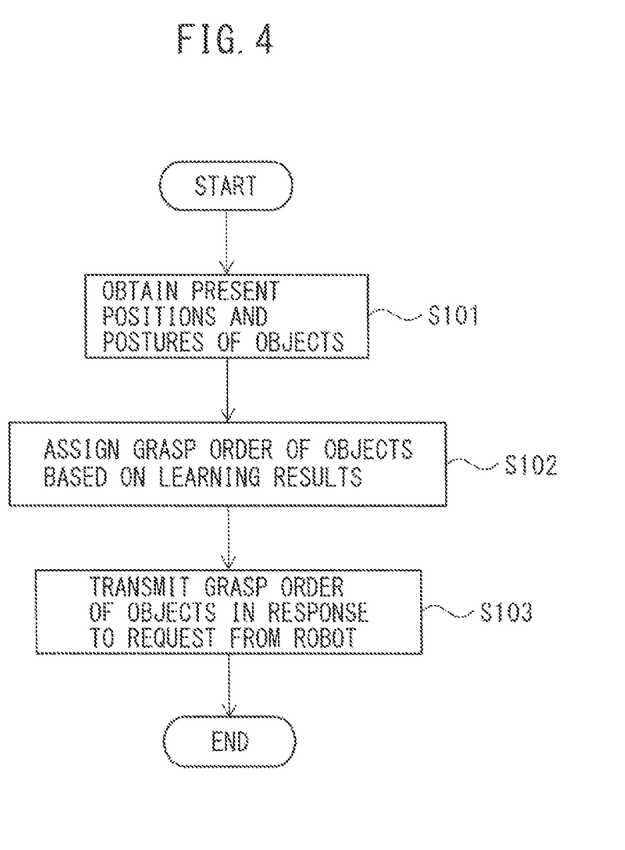
FIG. 4 is a flowchart of a process of the robot grasping the objects, using the machine learning device according to the first embodiment of the present invention.

Next, the operation of grasping objects with a robot by the machine learning device according to the first embodiment of the present invention will be described with reference to the flowchart of FIG. 4. First, in step S101, the present positions and postures of a plurality of objects (p1 to p6) are obtained. The objects the grasp order of which is to be determined are objects disposed within a certain area 30 of a conveyor 10, as indicated by the dashed lines of FIG. 3. In the example of FIG. 3, the grasp order of the objects (p1 to p6) is to be determined. The certain area 30 of the conveyor 10 is preferably an area that contains an optimal number of objects based on a balance between the time required for calculating the cycle time, the torque, and the vibration in every combination of grasp order of the objects and the speed of the conveyor to move the objects.

Next, in step S102, the grasp order of the objects is assigned based on learning results. Next, in step S103, in response to a request from the robot 20, the grasp order of the objects is transmitted from the machine learning device 101 to the robot 20.

Figure 5:
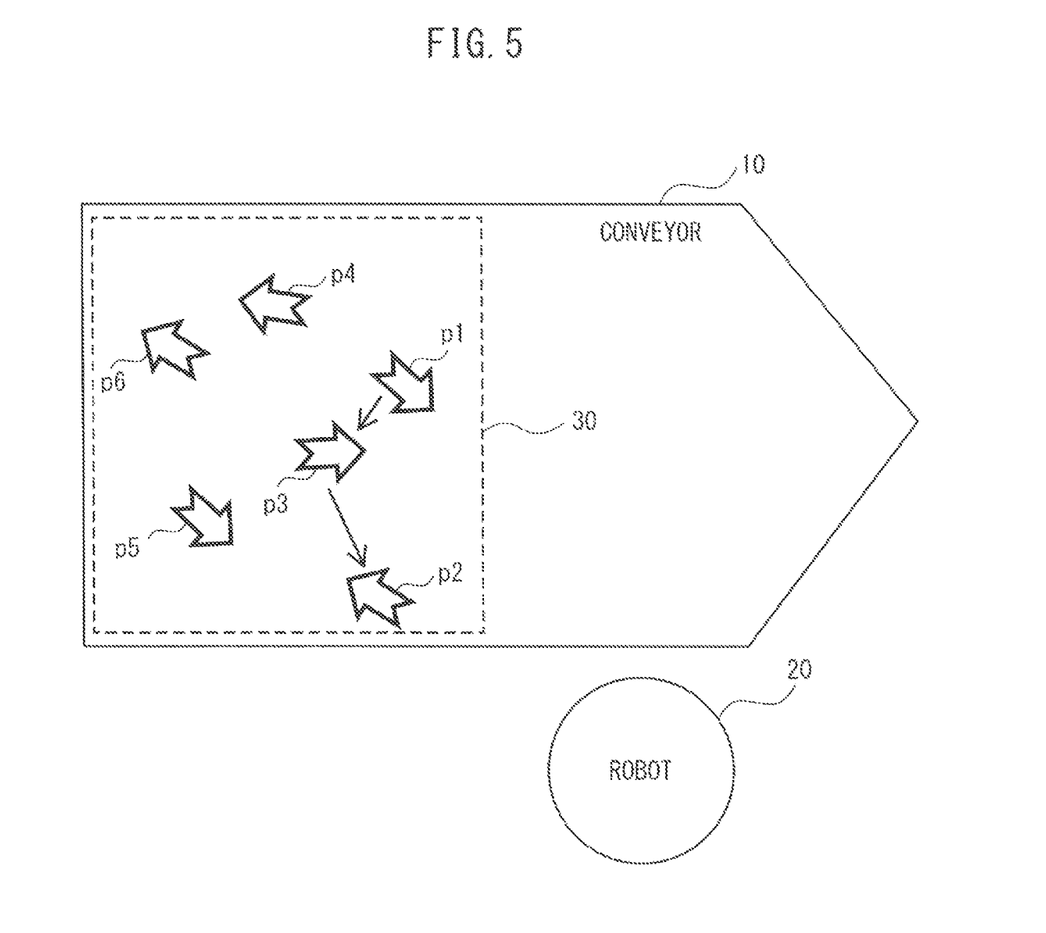
FIG. 5 is a drawing showing a method for grasping the objects disposed on the conveyor with the hand provided in the robot to put the objects in the containers, after the machine learning device according to the first embodiment of the present invention has performed learning.

FIG. 5 is a drawing showing a method for grasping the objects disposed on the conveyor with the hand provided in the robot to put the objects in the containers, after the machine learning device according to the first embodiment of the present invention has performed learning. As the results of learning, as indicated by arrows, the object p1 is grasped first, the object p3 is grasped next, and the object p2 is grasped last.

Grasping the objects in this order allows for a reduction in movement distance of the hand to grasp the objects, as compared with the case of the conventional art shown in FIG. 1 as an example. Thus, the time required to grasp the three objects (p1 to p3) is reduced. Therefore, it is possible to shorten the cycle time, i.e., the time required to store all the objects in the container.

The hand grasps three objects in this embodiment, but not limited thereto, the number of the objects grasped by the hand may be two or four or more. "Grasp" includes "suction" by the hand.

According to the present invention, the hand rotates by a smaller angle to grasp the object p3, after having grasped the object p1, than the angle by which the hand rotates to grasp the object a2 after having grasped the object a1, as described in the conventional art (see FIG. 1). Accordingly, it is possible to reduce the torque and the vibration that occur while the machine learning device is grasping the three objects (p1 to p3). Therefore, it is possible to reduce the total values of the torque and the vibration that occur while the machine learning device is storing all the objects in the container.

Next, the configuration of the learning unit 13 will be described. As shown in FIG. 2, the learning unit 13 includes a reward calculation unit 14 for calculating a reward based on the determination data, and a value function update unit 15 that updates a value function used for estimating the grasp order of objects so as to reduce at least one of the cycle time, the torque, and the vibration, based on the reward.

The learning unit 13 updates an action-value table corresponding to the grasp order of objects, based on the state variable including at least one of the cycle time, the torque, the vibration and the reward.

The learning unit 13 may update an action-value table that corresponds to at least one of the cycle time, the torque, and the vibration when another robot having the same configuration as the robot 20 stores other objects in a container, based on the state variable and reward of the other robot.

The reward calculation unit 14 calculates a reward based on at least one of the cycle time, the torque, and the vibration. Furthermore, when failing to grasp an object, in other words, when a grasping error occurs, the reward calculation unit 14 may provide a negative reward.

The learning unit 13 preferably further includes a decision determination unit 16 that determines the grasp order of objects in accordance with results of learning in accordance with a training data set.

Figure 6:
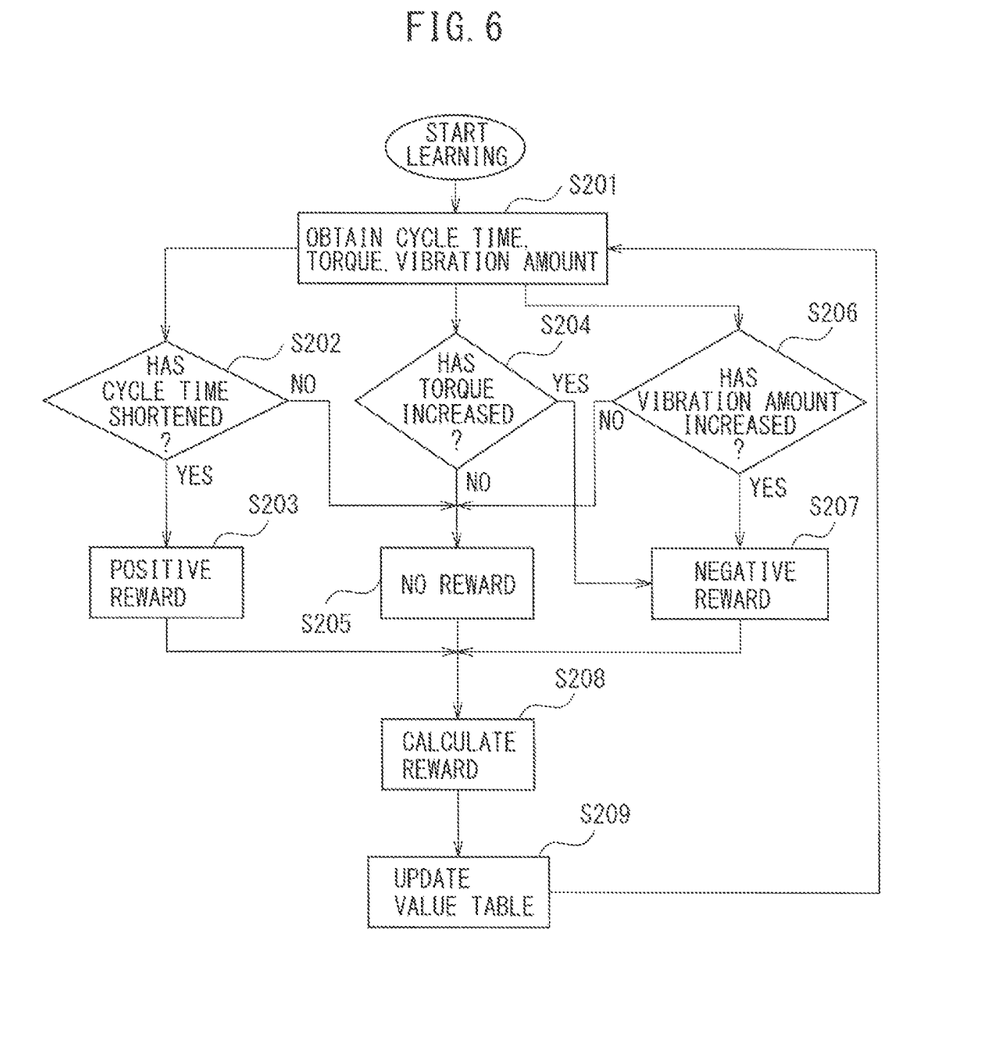
FIG. 6 is a flowchart showing a method for calculating a reward in the machine learning device according to the first embodiment of the present invention.

Next, a method for calculating a reward will be described. FIG. 6 is a flowchart showing a method for calculating a reward in the machine learning device according to the first embodiment of the present invention. First, in step S201, the state observation unit 11 obtains data on each of the cycle time, the torque, and the vibration amount.

Next, in step S202, the reward calculation unit 14 determines whether or not the cycle time is shorter than a reference value. When the cycle time is shorter than the reference value, a positive reward is provided in step S203. On the other hand, when the cycle time is equal to or longer than the reference value, the operation proceeds to step S205 and no reward is provided. The reference value of the cycle time is the average value of the cycle time when the robot was operated for a certain period of time in the past. Furthermore, the reference value may be adjusted in accordance with learning results, using the average value as an initial value.

Next, in step S204, the reward calculation unit 14 determines whether or not the torque has increased. When the torque is equal to or less than a reference value, the operation proceeds to step S205 and no reward is provided. On the other hand, when the torque is more than the reference value, a negative reward is provided in step S207. The reference value of the torque is the average value of the torque when the robot was operated for a certain period of time in the past. Furthermore, the reference value may be adjusted in accordance with learning results, using the average value as an initial value.

Next, in step S206, the reward calculation unit 14 determines whether or not the vibration amount has increased. When the vibration amount is equal to or less than a reference value, the operation proceeds to step S205 and no reward is provided. On the other hand, when the vibration amount is more than the reference value, a negative reward is provided in step S207. The reference value of the vibration amount is the average value of the vibration amounts when the robot was operated for a certain period of time in the past. Furthermore, the reference value may be adjusted in accordance with learning results, using the average value as an initial value.

Next, a reward is calculated in step S208. When $R_c$ represents a reward based on the cycle time, $R_r$ represents a reward based on the torque, and $R_v$ represents a reward based on the vibration, the total value R of the rewards is calculated by $R = \alpha \times R_c + \beta \times R_r + \gamma \times R_v$, using prescribed coefficients, which define weights.

Next, in step S209, the learning unit 13 updates an action-value table that corresponds to the grasp order of objects, based on a state variable of at least one of the cycle time, the torque, the vibration and the reward.

Figure 8:
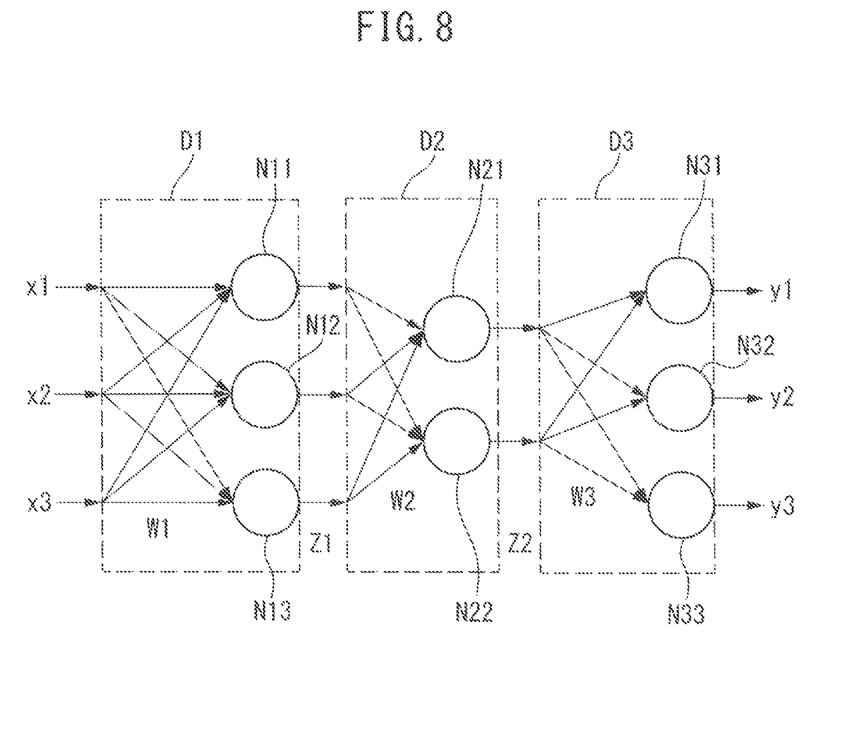
FIG. 8 is a schematic diagram of a three-layer neural network model.

The learning unit 13 preferably performs computation of a state variable observed by the state observation unit 11 in a multilayer structure, and updates an action-value table in real time. As a method for performing computation of a state variable in a multilayer structure, for example, a multilayer neural network, as shown in FIG. 8, is usable.

The machine learning device 101 shown in FIG. 2 will be described in detail. The machine learning device 101 has the function of learning knowledge, as well as the functions of extracting useful rules, knowledge representations, criteria, and the like from a data group inputted to the device by analysis and outputting determination results. There are various methods therefor, which are broadly divided into "supervised learning", "unsupervised learning", and "reinforcement learning". Moreover, when realizing these methods, a method called "deep learning" is used for learning the extraction of features themselves.

In "supervised learning", a large amount of data pairs of an input and a result (label) are provided to the learning device. The machine learning device learns features from the data set, and heuristically obtains a model to predict a result from an input, i.e., the relationship therebetween. "Supervised learning" can be realized using an algorithm such as a neural network, described later.

In "Unsupervised learning", only a large amount of input data is provided to the machine learning device. The machine learning device learns the distribution of the input data and applies compression, classification, alignment, or the like to the input data, without being supplied with corresponding output data as supervisors. The features of the data set can be subjected to clustering by analogy. With the use of this result, while providing a certain criterion, an output is assigned so as to optimize the criterion, and this allows for a prediction of the output. There is also a method called "semi-supervised learning" as an intermediate problem setting between "supervised learning" and "unsupervised learning", in which part of data includes pairs of an input and an output while the other includes only inputs. In this embodiment, data that can be obtained without actually operating the robot is used in the unsupervised learning, in order to improve learning efficiency.

Problems in the reinforcement learning are determined as follows.

The robot observes an environment state and determines an action.

The environment varies in accordance with some rule, and the actions of the robot itself sometimes vary the environment.

A reward signal returns whenever an action is performed.

The aim is to maximize a total (discounted) reward in the future.

The learning is started from a state in which a result brought about by an action is not or is insufficiently known. The robot obtains the result as data, only after the robot is actually operated. In other words, it is necessary to search for an optimal action through trial and error.

The learning may be started from a good start point by performing conventional learning (using a method of the above-described supervised learning or inverse reinforcement learning) so as to mimic the action of a human in an initial state.

"Reinforcement learning" is a method for learning optimal actions based on the interactions between an action and an environment by learning actions, as well as determining and classifying, in other words, a learning method to maximize a total reward obtained in the future. In this embodiment, this indicates that actions having an effect on the future can be obtained. The following description takes Q learning as an example, but is not limited thereto.

Q learning is a method for learning a Q(s, a) value for selecting an action "a" in a certain environment state "s". In other words, in a certain state "s", an action "a" having the highest Q(s, a) value is selected as an optimal action. However, as to a combination of a state "s" and an action "a", a correct Q(s, a) value is not known at all in the beginning. Thus, an agent chooses various actions "a" in a certain state "s", and is provided with a reward for each action "a". Therefore, the agent learns to select a better action, i.e., a correct Q(s, a) value.

The aim is to maximize a total reward to be obtained in the future, i.e., to obtain Q(s, a)=E [$\Sigma \gamma^t r_t$], as a result of actions (an expected value is taken when a state changes in accordance with optimal actions; the optimal actions have not been known, as a matter of course, and hence have to be found while learning.). For example, an update equation for a Q(s, a) value is represented as follows:

$$Q(s_t, a_t) \leftarrow Q(s_t, a_t) + \alpha \left( r_{t+1} + \gamma \max_a Q(s_{t+1}, a) - Q(s_t, a_t) \right)$$

where $s_t$ represents an environment state at a time t, and at represents an action at the time t. By executing the action $a_t$, the state changes to $s_{t+1}$. "$r_{t+1}$" represents a reward provided by the state change. A term with "max" represents the product of a Q value when an action "a" having the highest Q value that has been known at that time is selected in the state $s_{t+1}$, and γ. "γ" is a parameter of 0<γ≤1 called discount factor. "α" is a learning rate in the range of 0<α≤1.

This equation indicates a method for updating a Q ($s_t$, $a_t$) value of an action at in a state $s_t$ based on a reward $r_{t+1}$ that has returned as a result of the action $a_t$. This update equation indicates that, as compared with a Q($s_t$, $a_t$) value of an action "a" in a state "s", if a Q ($s_{t+1}$, max $a_{t+1}$) value of an optimal action "max a" in the next state derived from a reward $r_{t+1}$ plus the action "a" is higher, Q($s_t$, $a_t$) is increased. If not, Q($s_t$, $a_t$) is decreased. In other words, the value of an action in a certain state is approximated to an optimal action-value in the next state that is derived from a reward returning immediately as a result of the action and the action itself.

There are two methods for representing Q(s, a) values in a computer, that is, a method in which the Q values of all state-action pairs (s, a) are retained in a table (action-value table) and a method in which a function for approximating Q(s, a) values is prepared. In the latter method, the above-described update equation can be realized by adjusting a parameter for an approximation function using a stochastic gradient descent method or the like. As the approximation function, a neural network can be used as described later.

Figure 7:
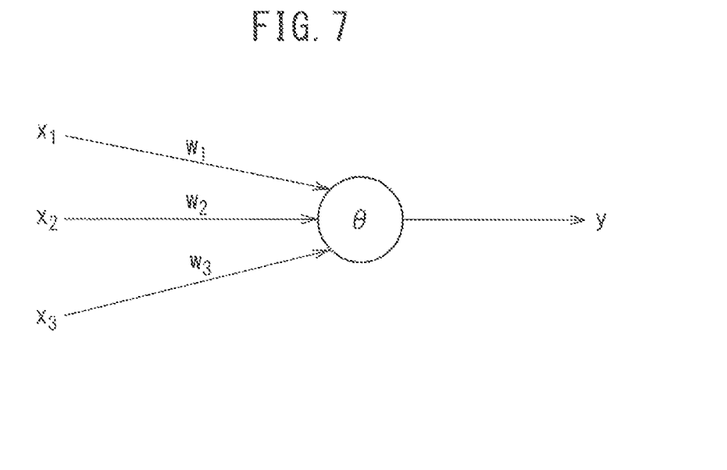
FIG. 7 is a schematic diagram of a neuron model.

As an approximation algorithm for a value function in supervised learning, unsupervised learning, and reinforcement learning, a neural network can be used. The neural network is constituted of, for example, an arithmetic unit, memory, and the like that imitate a neuron model as shown in FIG. 7. FIG. 7 is a schematic diagram of a neuron model.

As shown in FIG. 7, a neuron produces an output y in response to a plurality of inputs x (for example, inputs $x_1$ to $x_3$). Each of the inputs $x_1$ to $x_3$ is applied with a weight w ($w_1$ to $w_3$) corresponding to the input x. Thus, the neuron produces the output y represented by the following equation. Note that, all of the input x, the output y, and the weight w are vectors.

$$y = f_k(\Sigma_{i=1}^n x_i w_i - \theta)$$

where θ is a bias, and $f_k$ is an activation function.

Next, a three-layer neural network having weights of three layers, which is constituted of a combination of the above-described neurons, will be described with reference to FIG. 8. FIG. 8 is a schematic diagram of a neural network having weights of three layers D1 to D3.

As shown in FIG. 8, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13 while being weighted correspondingly. The weights applied to the inputs are collectively indicated by W1.

The neurons N11 to N13 output vectors Z11 to Z13, respectively. The vectors Z11 to Z13 are collectively indicated by a feature vector Z1, which is regarded as a vector that extracts a feature amount from the input vector. The feature vector Z1 is a feature vector between the weight W1 and a weight W2.

The vectors Z11 to Z13 are inputted to each of two neurons N21 and N22 while being weighted correspondingly. The weights applied to the feature vectors are collectively indicated by W2.

The neurons N21 and N22 output vectors Z21 and Z22, respectively. The vectors Z21 and Z22 are collectively indicated by a feature vector Z2. The feature vector Z2 is a feature vector between the weight W2 and a weight W3.

The feature vectors Z21 and Z22 are inputted to each of three neurons N31 to N33 while being weighted correspondingly. The weights applied to the feature vectors are collectively indicated by W3.

Finally, the neurons N31 to N33 output results y1 to y3, respectively.

The neural network has a learning mode and a value prediction mode. In the learning mode, the weight W is learned using a learning data set. In the value prediction mode, the action of the robot is determined through the use of the parameter (the word of "prediction" is used for the sake of convenience, but various tasks including detection, classification, inference, and the like can be performed).

In the value prediction mode, data that has been obtained by actual operation of the robot may be immediately learned and reflected in the next action (on-line learning). Also, learning may be collectively performed using a data group collected in advance, and a detection mode may be performed thereafter using the parameter (batch learning). In an intermediate manner, the learning mode may be performed whenever a certain amount of data is accumulated.

The weights W1 to W3 can be learned using an error back propagation algorithm (backpropagation algorithm). Information about an error enters from the right and propagates to the left. The error back propagation algorithm is a method in which each weight is adjusted (learned) with respect to each neuron so as to minimize the difference between an output y and an actual output y (supervisor) in response to an input x.

Such a neural network may have layers of more than three (called deep learning). An arithmetic unit that performs feature extraction from inputs in stages and regression of results can be automatically acquired from only supervisor data.

Accordingly, in order to perform the Q learning described above, as shown in FIG. 2, the machine learning device 101 according to this embodiment includes the state observation unit 11, the learning unit 13, and the decision determination unit 16. However, a machine learning method applied to the present invention is not limited to Q learning. For example, in the instance of applying supervised learning, a value function corresponds to a learning model, and a reward corresponds to an error.

As shown in FIG. 2, the state of the robot 20 includes a state indirectly changed by an action and a state directly changed by an action. The state indirectly changed by an action includes the cycle time, the torque, and the vibration. The state directly changed by an action includes a current value.

The learning unit 13 updates an action-value that corresponds to a present state variable and an action to be taken in the action-value table, based on the update equation and the reward.

In the example of FIG. 2, the own action-value table is updated using the action-value table updated by the learning unit of the own machine learning device, but is not limited thereto. The own action-value table may be updated using an action-value table updated by a learning unit of another machine learning device different from the own machine learning device.

Second Embodiment

Figure 9:
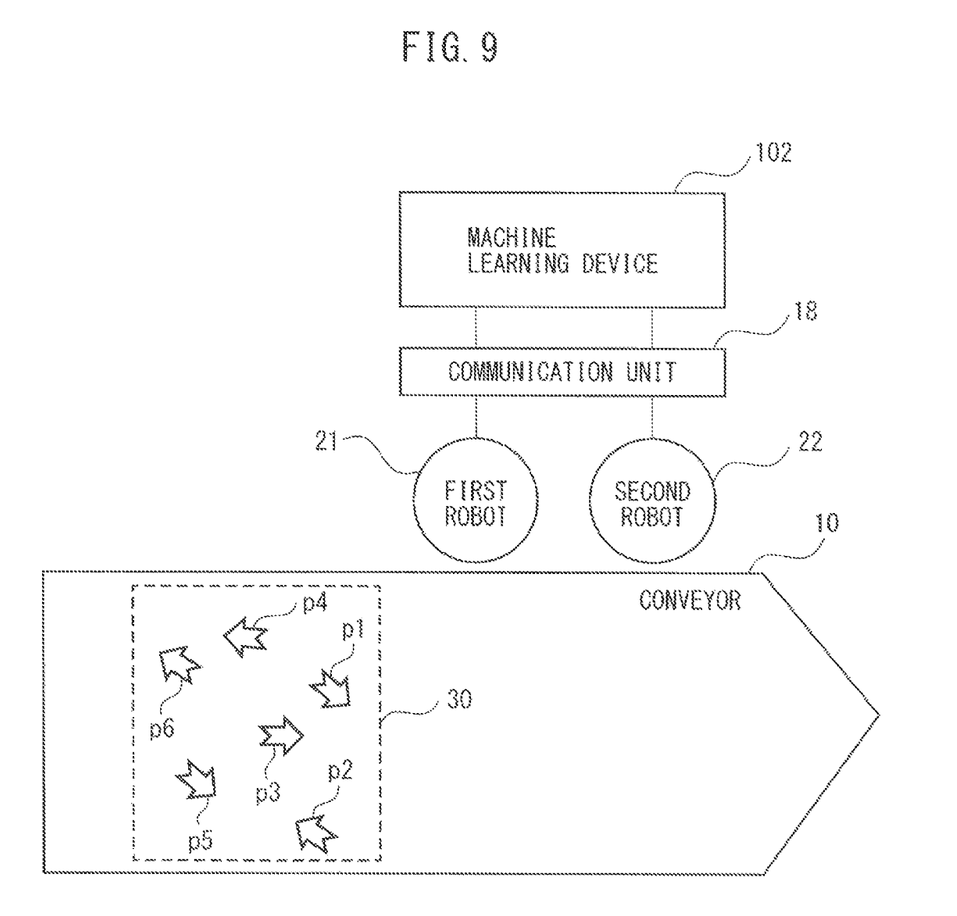
FIG. 9 is a block diagram of a machine learning device according to a second embodiment of the present invention.

A machine learning device according to a second embodiment of the present invention will be described. FIG. 9 is a block diagram of the machine learning device according to the second embodiment of the present invention. The difference between a machine learning device 102 according to the second embodiment of the present invention and the machine learning device 101 according to the first embodiment is that the machine learning device 102 is connected to a first robot 21 and a second robot 22 through a communication unit 18, i.e., a network, and the state observation unit 11 obtains a present state variable through the network. The other configurations of the machine learning device 102 according to the second embodiment are the same as that of the machine learning device 101 according to the first embodiment, and thus a detailed description thereof is omitted.

The machine learning device 102 is preferably installed in a cloud server.

It may be difficult for a robot to perform learning during high speed operation, owing to a heavy processing load. According to the configuration of the machine learning device of the second embodiment of the present invention, learning is performed by a device other than a robot controller, thus reducing the burden on the robot.

Third Embodiment

Figure 10:
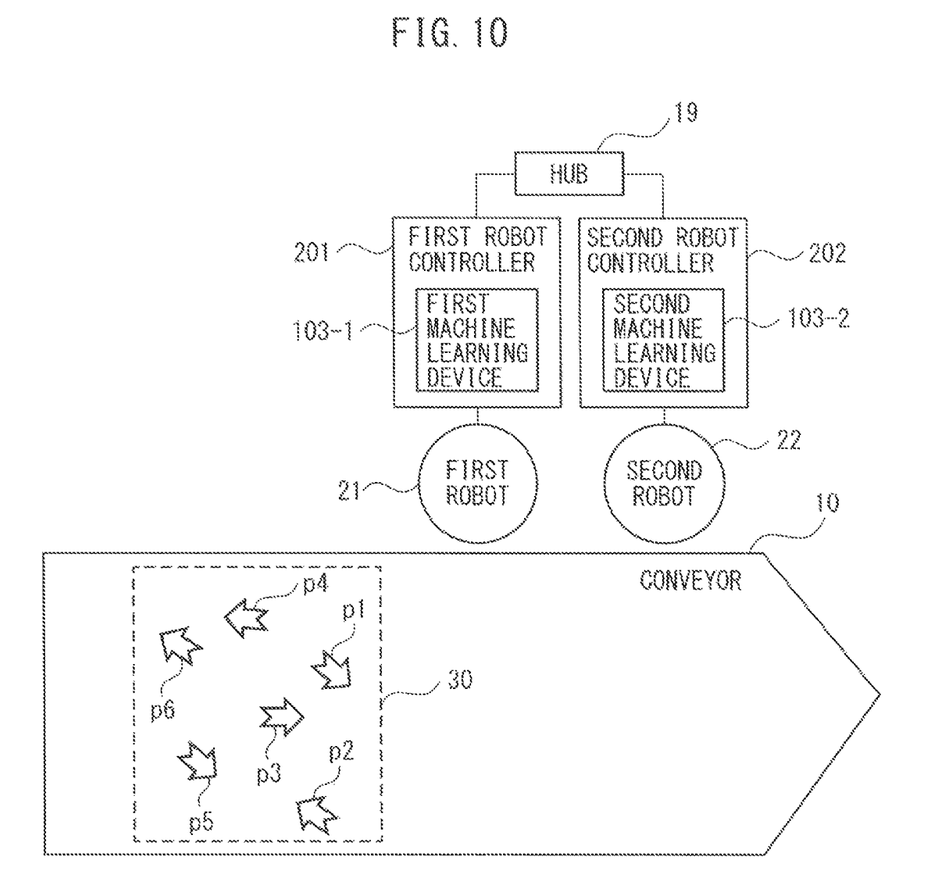
FIG. 10 is a block diagram of a machine learning device according to a third embodiment of the present invention.

Machine learning devices according to a third embodiment of the present invention will be described. FIG. 10 is a block diagram of the machine learning devices according to the third embodiment of the present invention. The difference between machine learning devices 103-1 and 103-2 according to the third embodiment of the present invention and the machine learning device 101 according to the first embodiment is that a machine learning device is provided in each of a plurality of robot controllers connected through a hub 19. The other configurations of the machine learning devices 103-1 and 103-2 according to the third embodiment are the same as that of the machine learning device 101 according to the first embodiment, and thus a detailed description thereof is omitted.

A first machine learning device 103-1 is provided in a first robot controller 201 for controlling a first robot 21. A second machine learning device 103-2 is provided in a second robot controller 202 for controlling a second robot 22.

This structure allows the shared use of an action-value table created by one of the machine learning devices between the machine learning devices, thus improving the efficiency of learning.

Fourth Embodiment

Figure 11:
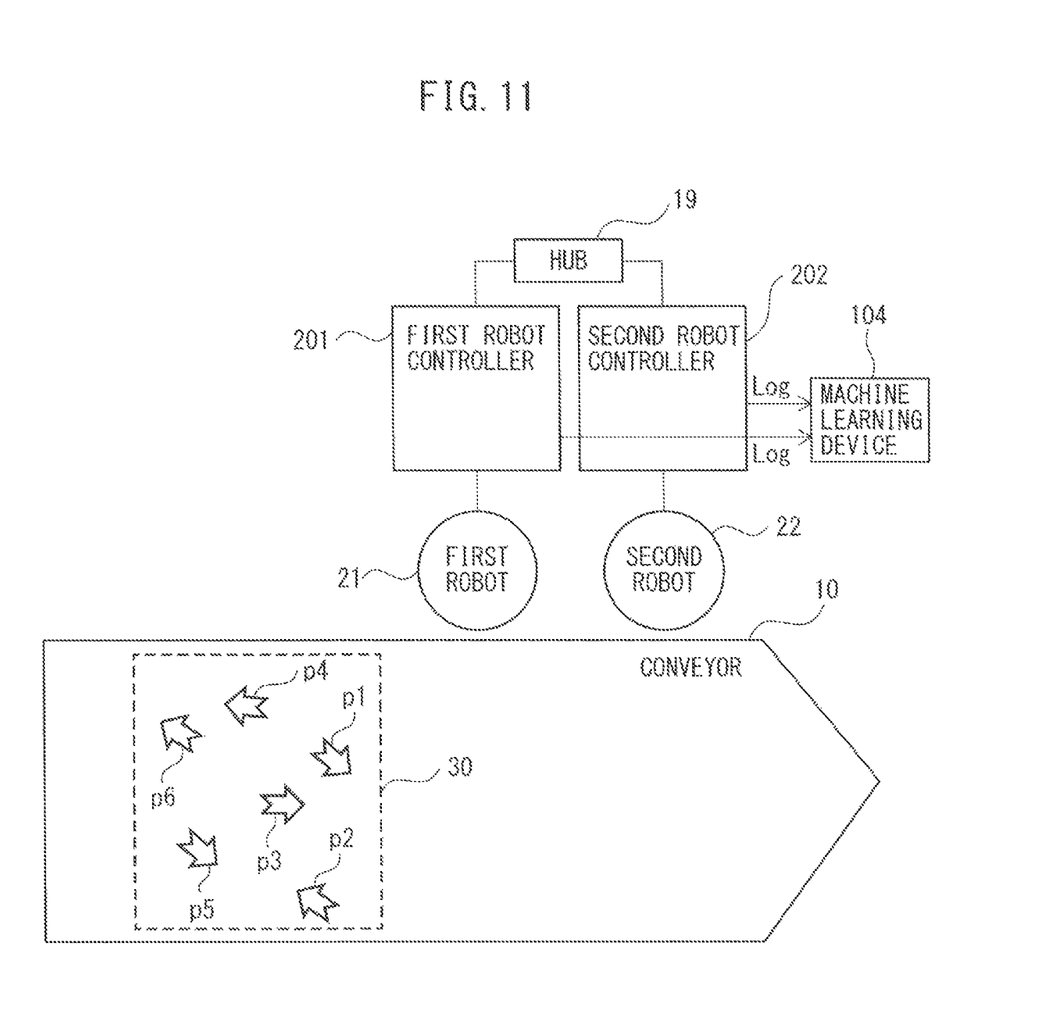
FIG. 11 is a block diagram of a machine learning device according to a fourth embodiment of the present invention.

A machine learning device according to a fourth embodiment of the present invention will be described. FIG. 11 is a block diagram of the machine learning device according to the fourth embodiment of the present invention. The difference between a machine learning device 104 according to the fourth embodiment of the present invention and the machine learning device 101 according to the first embodiment is that the machine learning device 104 records and collects the positions and postures of objects disposed on a conveyor, and reproduces offline the positions and postures of the objects (p1 to p6) on the conveyor 10 in order to learn the optimal grasp order of the objects. The other configurations of the machine learning device 104 according to the fourth embodiment are the same as that of the machine learning device 101 according to the first embodiment, and thus a detailed description thereof is omitted.

A first robot controller 201 controls a first robot 21, while a second robot controller 202 controls a second robot 22. The machine learning device 104 is provided outside the first robot controller 201 and the second robot controller 202. The machine learning device 104 receives data ("LOG") about the positions and postures of the objects, which is obtained from images captured by cameras (not shown) each provided in the vicinity of each of the first robot 21 and the second robot 22, and learns the optimal grasp order of the objects. The learning results are transmitted to the first robot controller 201 and the second robot controller 202, so that the first robot 21 and the second robot 22 can grasp the objects in the optimal order.

According to the machine learning device and the machine learning method of the embodiments of the present invention, it is possible to reduce the burden on the robot, as well as minimize the cycle time that is the time required for the robot to store the plurality of objects in the container using the hand having the function of grasping the objects.

What is claimed is:

1. A machine learning device for learning an operation condition of a robot that stores a plurality of objects disposed on a carrier device in a container using a hand for grasping the plurality of objects, the machine learning device comprising:
a hardware processor configured to
observe positions and postures of the plurality of objects and a state variable including cycle time to store the plurality of objects in the container and torque and vibration occurring when the robot grasps the plurality of objects, during operation of the robot,
obtain determination data for determining a margin of each of the cycle time, the torque, and the vibration against a respective allowance value,
learn the operation condition of the robot in accordance with a training data set constituted of a combination of the state variable and the determination data, and
in response to the cycle time, the torque, and the vibration being equal to or less than the allowance values, cause the hand to grasp the plurality of objects in a grasp order to minimize the cycle time.

2. The machine learning device according to claim 1, wherein the cycle time is a time from when the robot begins storing the plurality of objects in the container until the robot completes storing the plurality of objects in the container.

3. The machine learning device according to claim 1, wherein the torque is calculated based on a current flowing through a motor for driving the robot.

4. The machine learning device according to claim 1, wherein the vibration is calculated based on an acceleration detected by an acceleration sensor provided in the hand.

5. The machine learning device according to claim 1, the hardware processor is configured to determine the grasp order of the plurality of objects based on a learning result in accordance with the training data set.

6. The machine learning device according to claim 1, wherein the machine learning device is connected to the robot through a network, and
the hardware processor is configured to obtain a present state variable through the network.

7. The machine learning device according to claim 1, wherein the machine learning device is installed in a cloud server.

8. A machine learning device, for learning an operation condition of a robot that stores a plurality of objects disposed on a carrier device in a container using a hand for grasping the plurality of objects, the machine learning device comprising:
a hardware processor configured to
observe positions and postures of the plurality of objects and a state variable including cycle time to store the plurality of objects in the container and torque and vibration occurring when the robot grasps the plurality of objects, during operation of the robot,
obtain determination data for determining a margin of each of the cycle time, the torque, and the vibration against a respective allowance value,
learn the operation condition of the robot in accordance with a training data set constituted of a combination of the state variable and the determination data,
calculate a reward based on the determination data,
update a value function used for estimating a grasp order of the plurality of objects so as to reduce at least one of the cycle time, the torque, or the vibration, based on the reward,
update an action-value table that corresponds to the grasp order of the plurality of objects, based on the state variable of the cycle time, the torque, and the vibration and the reward, and
update an action-value table that corresponds to at least one of the cycle time, the torque, or the vibration when another robot having a same configuration as the robot stores other objects in a container, based on a state variable of the another robot and the reward.

9. The machine learning device according to claim 8, wherein the hardware processor is configured to calculate the reward based on at least one of the cycle time, the torque, or the vibration.

10. A machine learning method for learning an operation condition of a robot that stores a plurality of objects disposed on a carrier device in a container using a hand for grasping the plurality of objects, the machine learning method comprising the steps of:
observing positions and postures of the plurality of objects and a state variable including cycle time to store the plurality of objects in the container and torque and vibration occurring when the robot grasps the plurality of objects, during operation of the robot;
obtaining determination data for determining a margin of each of the cycle time, the torque, and the vibration against a respective allowance value;
learning the operation condition of the robot in accordance with a training data set constituted of a combination of the state variable and the determination data; and
in response to the cycle time, the torque, and the vibration being equal to or less than the allowance values, causing the hand to grasp the plurality of objects in a grasp order to minimize the cycle time.

* * * * *